United States Patent
Mason (10) Patent No.: US 9,334,946 B1
(45) Date of Patent: May 10, 2016

(54) VEHICLE TRANSMISSION PRESSURE REGULATOR VALVE

(71) Applicant: Superior Transmission Parts, Inc., Tallahassee, FL (US)

(72) Inventor: Dean Mason, Tallahassee, FL (US)

(73) Assignee: SUPERIOR TRANSMISSION PARTS, INC., Tallahassee, FL (US)

( * ) Notice: Subject to any disclaimer, the term of this patent is extended or adjusted under 35 U.S.C. 154(b) by 0 days.

(21) Appl. No.: 14/063,650

(22) Filed: Oct. 25, 2013

Related U.S. Application Data (60) Provisional application No. 61/718,316, filed on Oct. 25, 2012.

(51) Int. Cl.
*G05D 11/00* (2006.01)
*F16H 57/04* (2010.01)

(52) U.S. Cl.
CPC ....... *F16H 57/0435* (2013.01); *Y10T 137/2663* (2015.04)

(58) Field of Classification Search
CPC ................. F16B 13/0417; Y10T 137/2663
USPC ............. 137/115.13, 115.14, 115.26, 118.06, 137/118.07; 60/329
See application file for complete search history.

(56) References Cited

U.S. PATENT DOCUMENTS

| | | | | |
|---|---|---|---|---|
| 3,771,424 A | * | 11/1973 | Allen et al. | 91/446 |
| 4,416,189 A | * | 11/1983 | Budzich | 91/421 |
| 4,680,928 A | * | 7/1987 | Nishikawa et al. | 60/329 |
| 5,762,134 A | * | 6/1998 | Droste et al. | 165/284 |
| 6,695,737 B2 | * | 2/2004 | Park et al. | 475/127 |
| 7,540,299 B2 | * | 6/2009 | Muller et al. | 137/118.06 |
| 2006/0207655 A1 | * | 9/2006 | Xiang et al. | 137/118.02 |

* cited by examiner

*Primary Examiner* — R. K. Arundale
(74) *Attorney, Agent, or Firm* — Dowell & Dowell, PC (57) ABSTRACT

A vehicle transmission pressure regulator valve for regulating oil flow to a torque converter clutch from a pump in a lubrication circuit of the transmission wherein the valve includes a plurality of spaced annular lands integrally formed with a core body of the valve and wherein at least an outermost regulation line dump circuit control land and a second intermediate torque converter feed control land are tapered inwardly toward the core body and in a direction of an innermost pressure regulator balance land so to dynamically regulate flow into the regulation dump line and the torque converter circuit feed circuits due to the tapered surfaces of the two valve lands and wherein an additional converter assist spring is seated within an inner end of the valve so as provide a continuous force urging the valve toward and open position within the valve seat bore of the transmission.

13 Claims, 7 Drawing Sheets

VEHICLE TRANSMISSION PRESSURE REGULATOR VALVE

BACKGROUND OF THE INVENTION

1. Field of the Invention

The present invention is directed to automotive vehicle transmissions and more particular to pressure regulating valves for controlling oil flow through hydraulic circuits from an oil pump to both a torque converter and a lubrication/relief valve and to a pressure regulator balance port and to a method of modifying valve lands to provide for increased fluid supply to the torque converter and to establish a steady stream progressive flow rate of oil into the hydraulic circuits to improve torque converter clutch apply and release functions and to reduce heat buildup in the transmission to prevent torque converter damage or burn out.

2. Brief Description of the Prior Art

The majority of automatic transmission pressure regulation systems presently in use operate on a pulsed delivery principle. This pulsed delivery is the result of the valve's mechanical properties. Conventional valves are produced on automatic lathes and are round when viewed from an end view. Such valves have a plurality of outwardly extending lands which function to block or establish oil flow to or from lube circuits and components of the transmission such as the torque converter and lubrication and relief valve circuits. Conventional lands when viewed from the side appear to have squared 90° corners in that the front, rear and outer faces thereof and thus are planar along any given line. Although forming the lands with flat faces is easy and economical, in operation, the valves must cycle IN and OUT, opening and closing their respective flow ports to regulate oil flow thus creating a hydraulic pulse during each cycle. In essence, there is an instant charge or pulse of oil being sent to the torque convert and the lubrication relief valve circuits as the lands move to open flow to the inlet ports thereto.

In addition, automatic transmissions do not have perfectly sealed hydraulic circuits, and some leakage occurs, such in clutch drum apply circuits, accumulators, servos, at valves and plugs in the valve body, or loss of output efficiency in the transmission pump assembly due to internal "backwash". Further, leakage increases as oil is heated and becomes less viscous.

By way of example, if, as in the Honda 4 & 5 speed automatic, a transmission pump is not designed with sufficient output capacity, system wide pressure will fall below the minimum requirements and begin to shut down secondary systems, like torque converter fill and flow to the transmission cooler.

The pressure regular valve springs in the Honda 4 and 5 speed transmissions are calibrated to regulate system pressure to a minimum of approximately 118 psi, and a maximum of approximately 210 psi, depending on operating conditions. Although the pressure regulator may be able to sustain the pressure within the circuits while the fluid is cooler and thicker, under hotter operating conditions, and when the vehicle is at a stop and transmission is in a drive gear at idle, the pump will not be able to produce enough gallons per minute (GPM) to overcome all the accumulated leaks and maintain pressure sufficient to hold the pressure regulator valve open against valve springs. Main line pressure then drops well below the minimum desired 118 psi. It is typical to see HOT pressure readings of 90 psi at idle, and VERY HOT readings as low as 60 psi. But any time the pressure falls below 118 psi, the pressure regulator valve closes, shutting off fluid flow to converter, cooler, and lubrication circuits. At this point the pressure regulator valve is not functioning and there is insufficient fluid being supplied to the torque converter. When at a stop, if there is not sufficient flow to hold the converter clutch released, it will drag and burn out the clutch lining (a layer of friction material bonded to the damper assembly). If the pressure regulator closes while the control system has the converter clutch in APPLY mode, there will be insufficient pressure to keep it firmly applied, and slippage occurs. This slippage also results in clutch lining burnout.

In view of the foregoing, there is a need to improve the operating characteristics of the pressure regulator control valve used on some conventional automotive transmissions in order to avoid the problems associated with pulsed oil supply and insufficient volume flow to the torque converter and lube circuits, and to improve supply of oil from the transmission pump to the torque converter to prevent overheating and damage.

SUMMARY OF THE INVENTION

The present invention is directed to a new pressure regulator valve for use in automotive automatic transmissions to control transmission fluid flow between a transmission pump and to a torque converter, cooler and lubrication circuits of the transmission and is particularly adapted for use in certain Honda 4 and 5 speed automatic transmissions. The valve is formed having a valve core portion having three spaced lands extending outwardly there from for controlling fluid flow from the pump to the torque converter, lube and relief valve circuit and a pressure regulator balance port. The valve is configured to be installed to replace an original equipment regulator control valve of the transmission and thus to reciprocally fit within an existing bore of the transmission. Unlike the conventional pressure regulator valves having first, second and third flow port control lands having substantially flat front and rear faces, the new valves include second and third lands having inwardly tapering conical rear faces that extend toward the first or rear balance control land of the valve, preferably at an angle of between 25° to 50°, relative to the core of the valve. In some embodiments the rear tapering faces are smooth conical surfaces and in others the rear tapering faces may be stepped conical structures.

In a first embodiment of the regulator control valve of the invention, the tapered rear surfaces of the second and third lands are both generally angled at approximately 35° while the first balance land has flat front and rear faces similar to the first land of the original equipment valve. In a second embodiment of the invention, the regulator control valve includes second and third lands which taper at different angles relative to the core of the valve. In the embodiment shown herein, the second land tapering surface extends at an angle of approximately 35° relative to the core whereas the angle of the rear surface of the third land extends at approximately 45° relative to the core. In the second embodiment, the first land includes a front conical face which tapers inwardly toward the core and the intermediate or second land has a front face having conical outer edge portion angled at approximately 45°. Also, in the second embodiment, a pair of metering flats may be provided along the outer edge of the rear face of the first land with the flats being spaced 180° from one another.

Due to the sloped rear faces of the second and third lands of the pressure regulator valve of the present invention, as the lands move relative to the fluid inlets or outlets in the surrounding transmission circuits, a steady fluid stream is provided at progressively changing rates. Because of this, the valve functions to dynamically regulate flow at any point along the sloped or tapered surfaces without fully closing or opening. The regulation point along the sloped surfaces of the lands is determined according to available volume supply from the transmission pump and is therefore dynamically sensitive to temperature and fluid viscosity as well as engine RPM and transmission pump speed and output.

With either of the embodiments of the invention, an additional balance assist is provided by a spring which seats within a blind hole made in the inner end of the pressure regulator valve and which extends along a central axis of the core of the valve. The balance spring is provided for creating additional fluid feed through the valve at pressures below the normal opening pressure for feed to the torque converter. It has been determined that while operating some Honda® vehicles in third gear at speeds of about 30 to 35 miles per hour with lockup command ON and with the engine operation at about 1200 RPM, the transmission becomes hot and pressures against the valve falls below normal opening pressure for moving the intermediate or second land to establish flow to the torque converter. The spring is partially seated within the blind hole. The additional spring provides approximately 5.5 pounds of tension when the valve is bottomed at rest within the valve bore of the transmission. When the valve is regulating on the pressure regulator dump land number three, the additional spring is not functional. The additional spring only comes into play at lower RPM when the pressure regulator valve begins to close the torque converter feed circuit when pressures drop below 118 psi, for the Honda® transmissions described herein, and retains the valve in position to permit oil to flow to the torque converter until the line pressure drops to between approximately 90 to 95 psi. The balance assist spring thus extends the functional range of oil feed to the torque converter so that it will have sufficient oil for safe lockup when in third gear.

The invention further provides for increasing leakage flow to the torque converter by reducing the diameter of the second or intermediate land of the valve from the original equipment specifications. By way of example, for the Honda® 4 and 5 speed automatic transmissions, the diameter of the center or number two land which is normally 0.511 to 0.5112 inch, the same for all three lands, is reduced to approximately 0.5093 inch, plus or minus 0.0002 inch. The increase created in bore clearance supplies a full time torque converter feed equivalent to a hole of approximately 0.55 to 0.059 inch diameter. This additional feed will ensure that sufficient pressure is applied to hold a damper plate released when the transmission is operating in drive and rear engagements and when the vehicle is stopped and in drive. This prevents severe clutch heat buildup.

BRIEF DESCRIPTION OF THE DRAWINGS

The invention will be better understood with reference to the attached drawings wherein.

DESCRIPTION OF THE PREFERRED EMBODIMENTS

Figure 1:
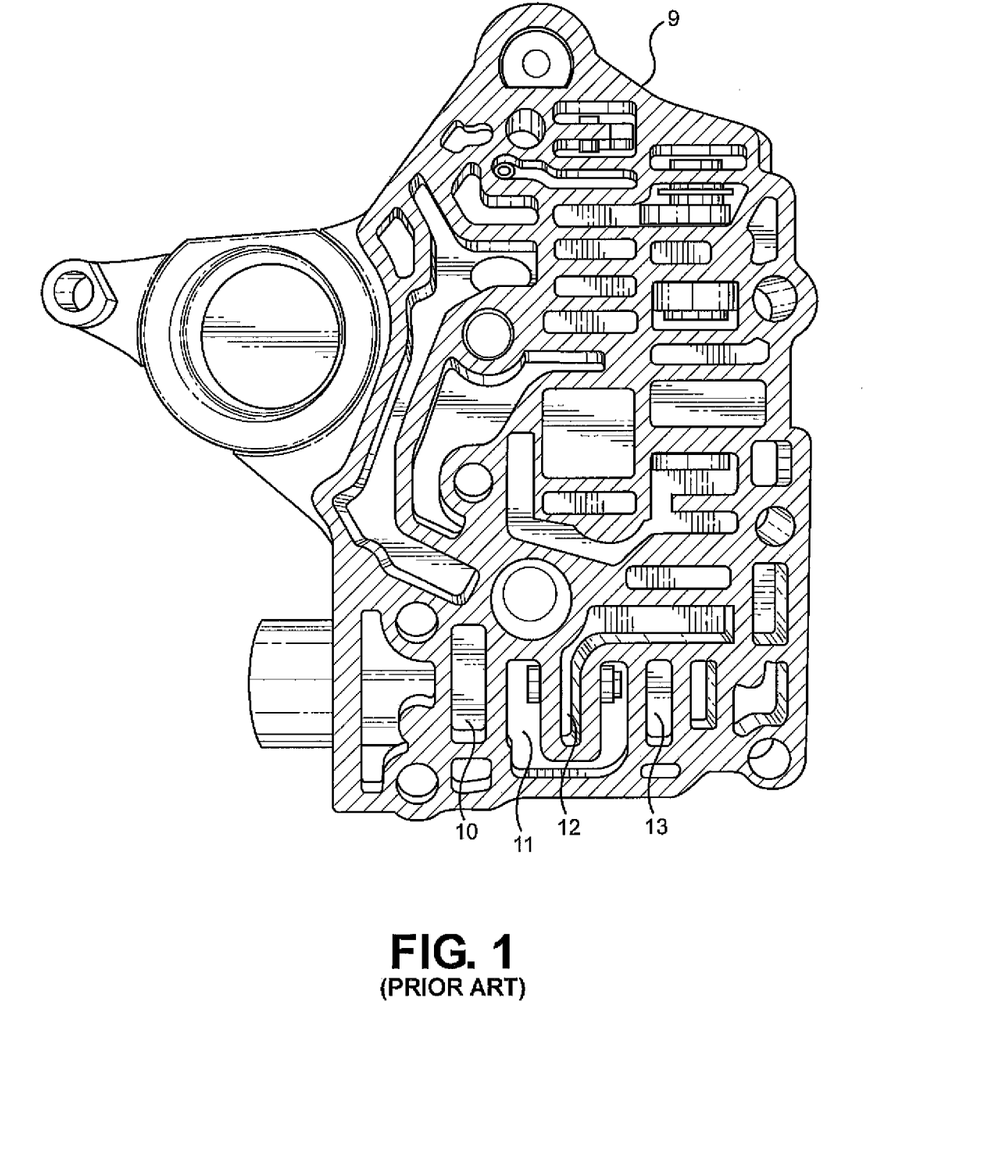
FIG. 1 is a cut away view of a portion of a Honda® transmission showing a pressure regulator dump, transmission pump input, torque converter output and pressure regulator balance.
Figure 2:
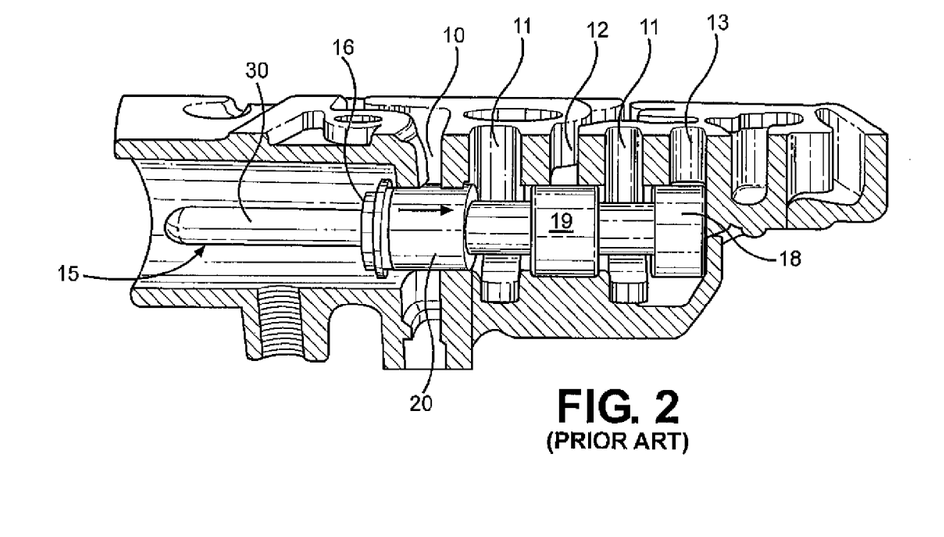
FIG. 2 is a cross section taken along line 2-2 of FIG. 1 showing an original equipment pressure regulator valve positioned at rest within a bore of the transmission.
Figure 3:
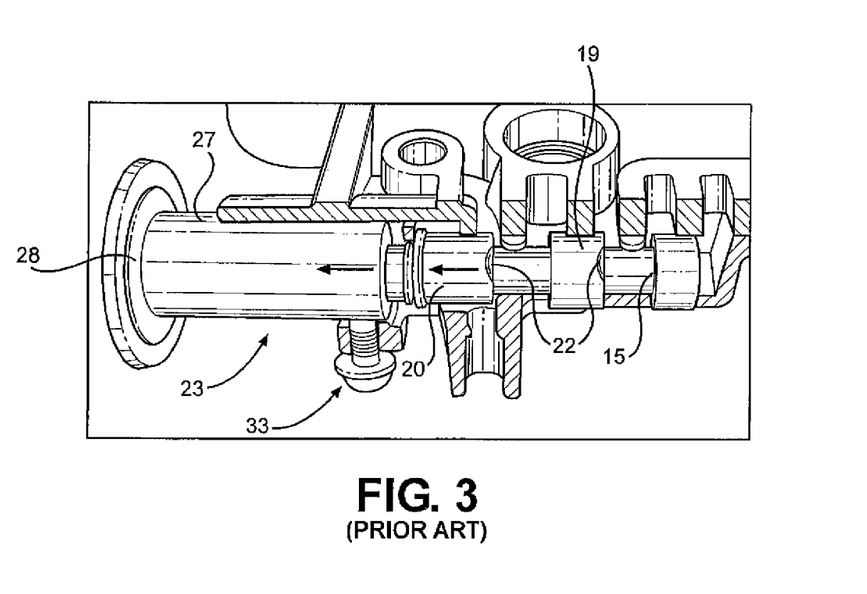
FIG. 3 is view similar to FIG. 2 showing a boost sleeve and springs mounted over the free elongated end of the valve also shown in FIG. 2.

With continued reference to the drawings, a convention Honda® pressure regulator casing 9 is shown in FIG. 1 wherein openings to the pressure regulator dump 10, the pump volume output line 11, torque converter feed 12 and pressure regulator balance 13 are shown. In FIG. 2 which is a cross section through FIG. 1, an original equipment pressure regulator valve 15 is shown within a bore 16. The valve includes a reduced diameter core 17 and three outwardly extending lands including a first inner pressure regulator balance land 18, a second intermediate converter feed control land 19 and an outer regulation line dump land 20. As shown in FIG. 3, a pair of small metering flats 22 are made in both the outer and rear faces of lands 19 and 20 and on opposite sides of the lands such that there are two metering flats on each of these lands spaced at 180° from one another.

As shown in FIGS. 2 and 3, the front and rear faces of each land are generally flat such that when the valve is viewed from the side as shown in the two figures, the upper and lower corners of each land are squared forming 90° corners. Due to the configuration of the lands, as the valve 15 moves the lands to initially open to the pressure release balance line 13, the torque converter feed 12 or the pressure regulator dump line 10 to a pressure relief valve, there is an instance pulse flow created to the outputs.

Figure 4:
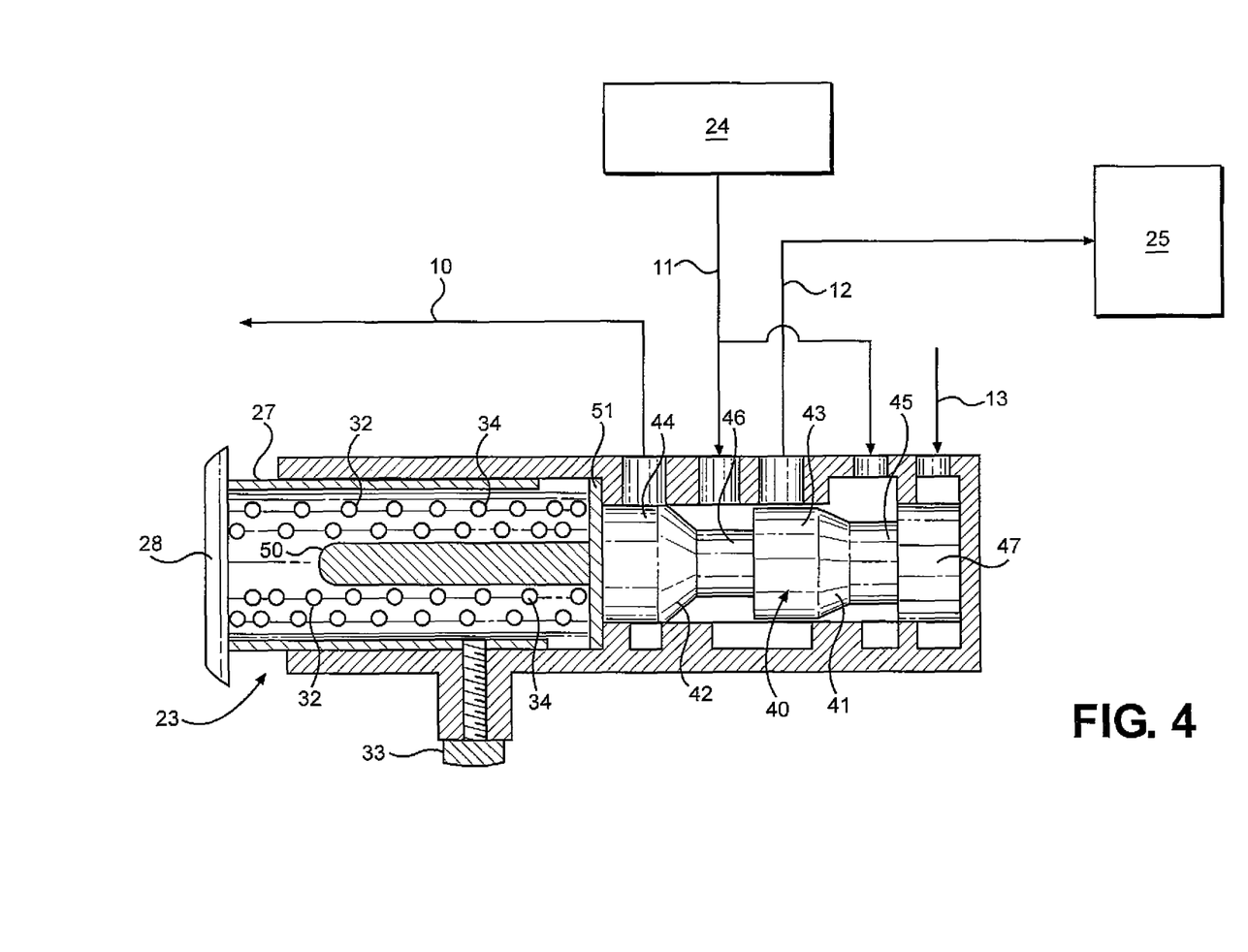
FIG. 4 is a cross sectional illustration view of the pressure regulator valve and boost sleeve of FIG. 3 and showing portions of the lubrication flow paths relative to the valve.

With reference to FIGS. 3 and 4, a boost sleeve assembly 23 is shown for maintaining the pressure regulator valve 15 in a rest state wherein fluid from a transmission pump 24 is not supplied to a torque converter 25. The boost sleeve assembly includes a sleeve 27 with enlarged head 28 which is engaged by a stator arm, not shown. Mounted about an extension 30 of the valve 15 are a primary outer pressure regulator spring 32 and a secondary inner pressure regulator boost spring 34. Generally the secondary boost spring 34 does not exert force against the pressure regulator valve 15 when the stator arm exerts no force against the head of the boost sleeve. When idling in neutral, the pressure regulated is determined only by the tension of the primary pressure regulator spring 32. In Honda® 4 and 5 speed automatic transmissions, approximately 118 psi is required to open the pressure regulator valve against the springs to begin feeding fluid to the torque converter 25. Below 118 psi, the pressure regulator valve remains closed. Generally, when idling in neutral or drive at cold start, approximately 120 psi is developed against the valve. As the fluid within the transmission becomes heated and the viscosity of the fluid thins, the pressures against the valve normally fall to as low as 50 to 60 psi such that the pressure regulator valve is not opened and no fluid is supplied to the torque converter except fluid that leaks within the transmission. The metering flats 22 are provided in order to permit some minimal flow by the intermediate or second land 19 before pressure within the lubrication circuits from the transmission pump rise to a level to force the pressure regulator valve to open to the torque converter. From measurements taken, it is estimated that only 0.1 to 0.7 gallons per minute (GPM) of transmission fluid are supplied to the torque convert when the transmission fluid is extremely hot and the pressure within the transmission is below the level of 118 psi. The flow level may increase to 1.2 GPM when the valve land 19 "cracks" open the feed port 12 to the torque converter circuit.

Figure 5:
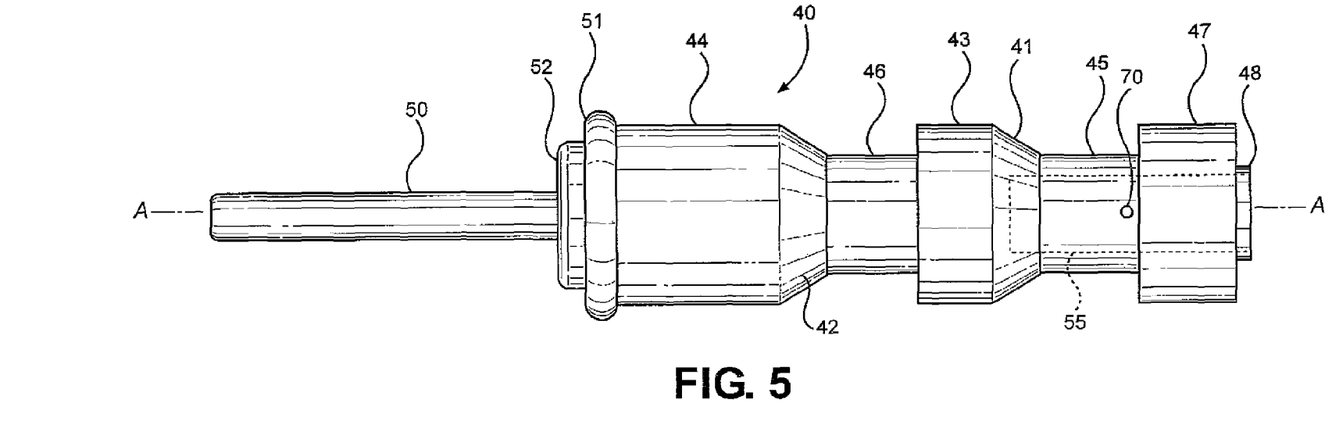
FIG. 5 is a side view of a first embodiment of pressure regulator valve in accordance with the teachings of the present invention.
Figure 12:
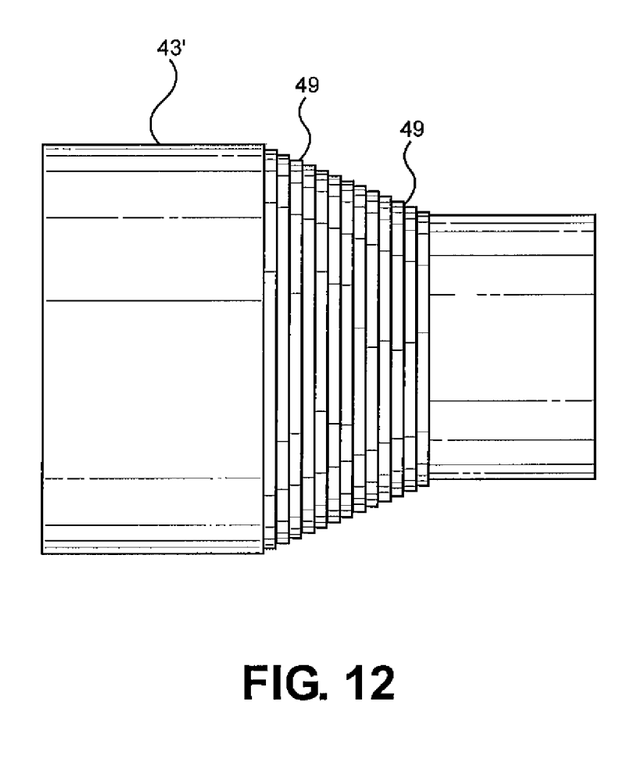
FIG. 12 is partial illustration view of one of the lands of the valve shown in FIG. 5 having a varied stepped tapering structure.

In order to overcome the overheating and low fluid flow problems of the original operating pressure regulator valve 15, the present invention includes a first embodiment of pressure regulator valve 40 having generally the same length and diameter dimensions and land widths as the original equipment valve 15 except that rear portions 41 and 42 of the second and third lands, 43 and 44, respectively, are tapered toward the core portions 45 and 46, respectively, and the inner land 47 of the valve is not tapered toward core portion 48, as is shown in FIG. 5. As the valve 40 is circular in cross section, the tapered portions are conical in configuration. In preferred embodiments of the invention, the walls of the tapered or sloping portions of the lands are smooth surfaces, however, as shown in FIG. 12, the rear portions 41 and 42 of the lands 43 and 44 may include a series of rearward extending stepped down portions of progressively reduced diameter as opposed to the smooth tapered walls of the embodiment of FIG. 5. FIG. 12 shows a modified land 43' with a plurality of stepped down portions 49. Also, the valve 40 includes a through hole 70 in core portion for passage of balance oil.

As shown in FIG. 5, a preferred angle of taper of the portions 41 and 42 is approximately 35°, although this angle may be varied. What is critical is that the lands to the pressure regulator dump line 10 and the torque converter feed 12 causes a variation in flow to be established as the lands 43 and 44 begin to open or close relative to the ports to the respective fluid circuits. The inner land 47 of the pressure regulator valve 40 is configured as a conventional "squared" land. The valve also includes a frontal extension 50 having annular flanged seat portions 51 and 52 for the ends of the conventional primary and secondary pressure regulator springs. The boost sleeve and the primary and secondary springs described with respect to the originally operating valve 15 are the same for use with the valve 40 of the invention. The general dimensions of a valve 40 for use in Honda 4 and 5 speed automatic transmissions are shown in FIG. 5. It should be noted, however, that the tapered lands taught with the present invention may be provided on lands of pressure regulator valves of other models of automatic transmissions taking in mind that the dimensions of the valve and lands must be changed to be compatible with such other transmissions.

As shown in FIG. 5, the core portion 46 between the second and first lands is slightly larger in diameter than the core portion 45 between the second and third lands. Also, in preferred embodiments of the invention, a hollow blind hole 55 is provided in the core portions 48 and land 47 which is aligned with a central axis A-A of the valve 40. The blind hole is provided to receive a supplemental converter open extension spring 56 for purposes which will be further described hereinafter.

As previously described, the sloped rear faces 41 and 42 of the intermediate and third lands 43 and 44, respectively, of the pressure regulator valve 40 are provided such that as the lands move relative to the fluid inlets into the torque converter and pressure regulator dump circuits, respectively, a steady fluid stream of lubrication and cooling fluid will be provided at progressively changing rates. Because of this, the valve functions to dynamically regulate flow at any point along the sloped or tapered surfaces without fully closing or opening. The regulation point along the sloped surface of the lands is determined according to available volume of fluid supply and is therefore dynamically sensitive to temperature and fluid viscosity as well as engine RPM and transmission pump speed and output. Due to the flow characteristics developed with the tapered land configuration, the pressure regular valve 40 of the inventions will operate more smoothly to provide a better and more consistent flow of transmission fluid to the torque converter so as to minimize converter overheating and burn out which is occurring with the original equipment operating valves 15.

Figure 7:
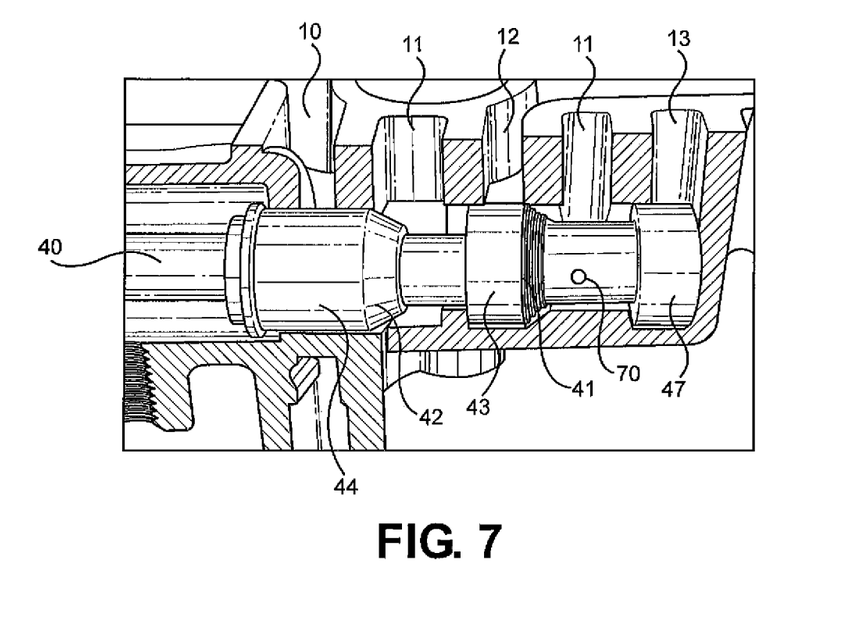
FIG. 7 is a side view of the pressure regulator valve of FIG. 5 shown in an at rest position within the bore of the transmission shown in FIG. 2.
Figure 8:
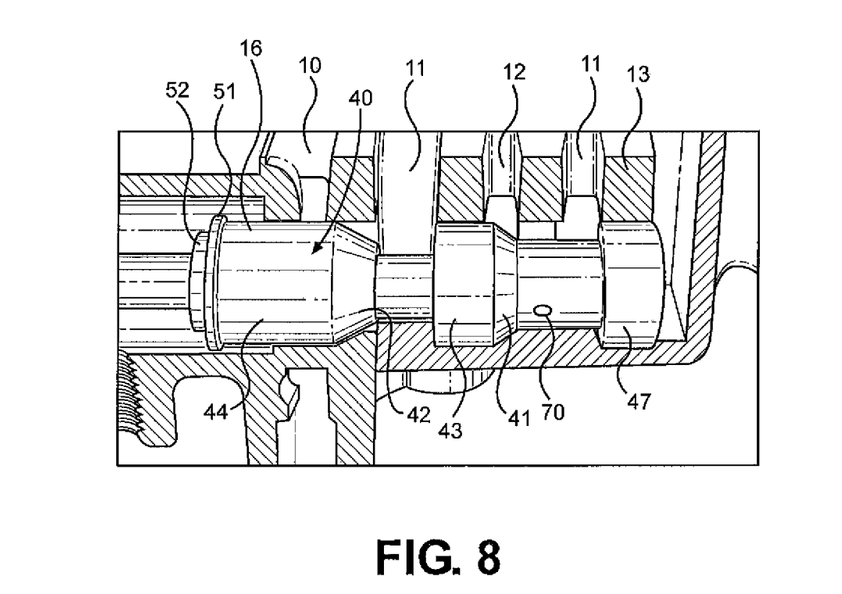
FIG. 8 is a view similar to FIG. 7 showing the valve approaching maximum flow to the torque converter.

With specific reference to FIG. 7, the valve 40 is shown fully at rest within the bore 16 of the transmission. In this position the land 47 blocks the pressure regulator balance inlet 13 while land 43 blocks the feed to the torque converter circuit and land 44 blocks the pressure regulator dump circuit inlet. When pressure from the transmission pump is sufficient to move valve 40 against the primary outer and secondary boost springs 32 and 34, the valve is shifted to the left within the bore, as shown in FIG. 8, so that the feed to the torque converter outlet at 12 is almost at full or maximum flow as the land 43 no longer blocks the outlet and the land 44 to the pressure regulator dump circuit is just about to open as the tapered surface 42 thereof is approaching an alignment to opening to the circuit. In the position shown, balance fluid enters the valve as the inlet 13 is no longer blocked by land 47.

Figure 6:
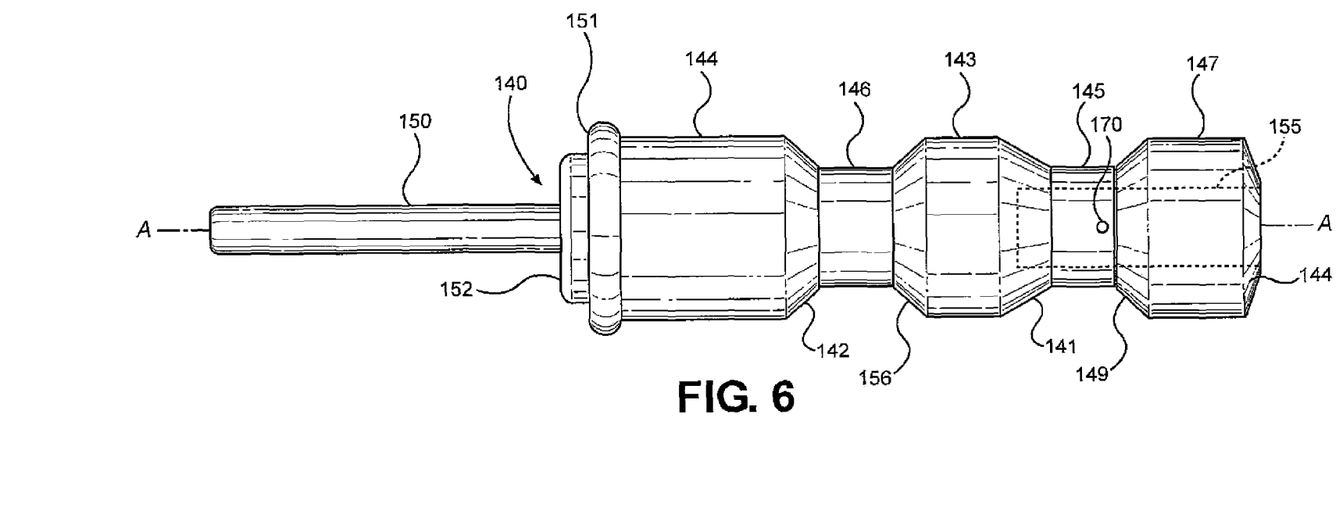
FIG. 6 is a side view of a second embodiment of pressure regulator valve in accordance with the teachings of the invention.

With specific reference to FIG. 6, a second embodiment of pressure regulator valve 140 is shown. The numbers used to describe the second embodiment will generally be the same numbers as used to describe the first embodiment raised by 100. The pressure regulator valve 140 is also generally the same length and diameter dimensions and has the same land widths as the original equipment valve 15 except that rear portions 141 and 142 of the second torque converter feed and third regulation dump lands, 143 and 144, respectively, are tapered toward the core portions 145 and 146, respectively, and the inner balance land 147 of the valve is also slightly tapered toward core portion 148, as is shown in FIG. 6. As the valve 140 is circular in cross section, the tapered portions are conical in configuration. In preferred embodiments of the invention, the walls of the tapered or sloping portions of the lands are smooth surfaces, however, as shown in FIG. 12, the rear portions of the lands 143 and 144 may include a series of rearward extending stepped down portions 49 of progressively reduced diameter as opposed to the smooth tapered walls of the embodiment of FIG. 6.

As shown in FIG. 6, a preferred angle of taper of the portions 141 is approximately 35° while a preferred angle of taper of portion 142 is shown at 45°, although these angles may be varied. What is critical is that the lands to the pressure regulator dump line 10 and the torque converter feed 12 causes a variation in flow to be established as the lands 143 and 144 begin to open or close relative to the ports to the respective fluid circuits. The inner land 147 of the pressure regulator valve 140 is configured so as to also have a tapered front wall 149 which is conical and angled at approximately 45° toward the core 145. Also, the torque converter feed control land 143 may also have a tapered front face 156 of a conical shape as shown at an angle of approximately 45°, however, these angles may vary as set forth above with respect to the first embodiment of the invention. The pressure regulator valve 140 also includes a frontal extension 150 having annular flanged seat portions 151 and 152 for the ends of the conventional primary and secondary pressure regulator springs. The boost sleeve and the primary and secondary springs described with respect to the originally operating valve 15 are the same for use with the valve 140 of the invention. The general dimensions of a valve 140 for use in Honda 4 and 5 speed automatic transmissions are shown in FIG. 6.

As also shown in FIG. 6, the core portion 146 between the second and first lands is slightly larger in diameter than the core portion 145 between the second and third lands and includes a through hole 170 for passage of balance oil. Also, as with the first embodiment of the invention, a hollow blind hole 155 is provided in the core portions 148 and land 147 which is aligned with a central axis A-A of the valve 140. The blind hole is provided to receive a supplemental converter open extension spring 56 for purposes which will be further described hereinafter. The second embodiment of valve 140 may also be provided with a pair of metering flats 152 which are provided on an outer edge of the rear face of the land 147 and which function as described with respect to the conventional metering flats provided on the valve 15.

The pressure regulator valves 40 and 140 of the present invention are able to fine tune fluid flow through the transmission to the torque converter while minimizing waste flow of conventional pulse type valves 15 of the conventional Honda® design. Further, the valves 40 and 140 drastically reduce pressure oscillation and valve bore wear. The valves 40 and 140 displace fluid flow to compensate for insufficient volume of fluid flow from under capacity transmission pumps especially at low engine RPM and thus correct the most serious malfunctions in original operating transmissions of torque converter lockup clutch failure.

Figure 9:
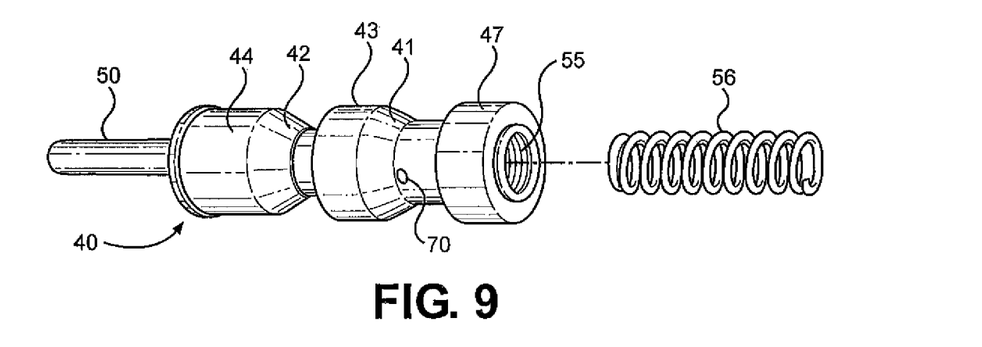
FIG. 9 is a side perspective assembly view of a varied embodiment of pressure regulator control valve in accordance with the present invention.
Figure 10:
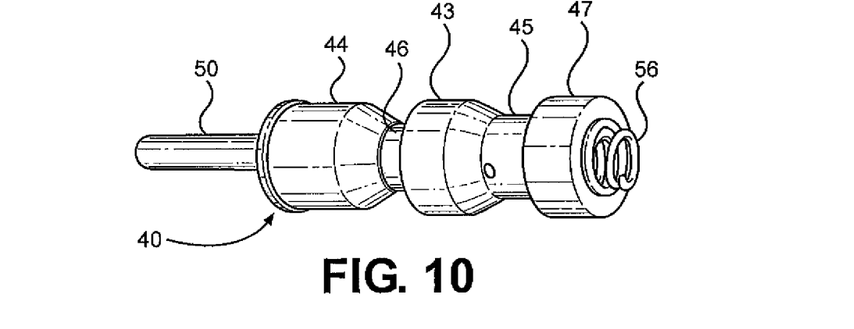
FIG. 10 is a view similar to FIG. 9 showing a biasing spring mounted within the inner end of the valve shown in FIG. 9.
Figure 11:
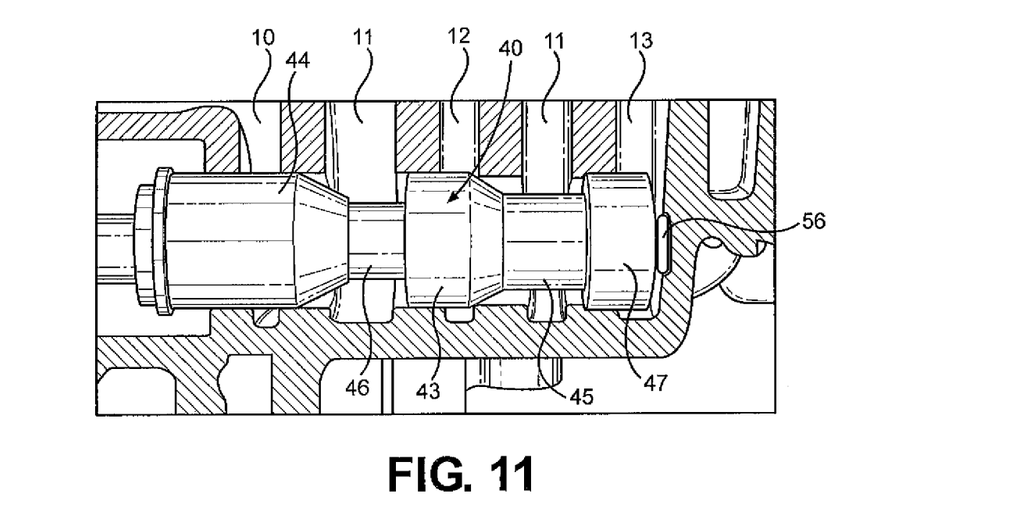
FIG. 11 is a view of the valve shown in FIGS. 9 and 10 positioned within the transmission bore of FIG. 2.

With specific reference to FIGS. 9-11, in order to correct the lack of proper fluid supply to the torque converter at various operating engine speeds and transmission settings, such as at low engine RPMs and when the transmission fluid is hot and the pressure within the transmission lubrication or hydraulic circuits is below the pressure to effectively open the pressure regulator valve 40 to properly supply fluid to the torque converter, a balance assist or converter open extension spring 56 is mounted within the blind hole 55 of the valve 40 or blind hole 155 of valve 140. The spring is designed to be effective at low RPM such that when the pressure regulator valve 40, 140 begins to close flow to the torque converter circuit 11, the spring will provide additional force to maintain the valve open even though pressures within the circuits fall below the normal closing pressure established by the valve springs of approximately 118 psi. The spring 56 provides approximately 5.5 pounds of tension when the valve is bottomed in the valve bore as shown in FIG. 10. The force is sufficient to maintain the valve 40 slightly opened to the converter feed circuit until the line pressures fall to 90 to 95 psi. The spring thus extends flow to the torque converter so as to maintain pressure on a damper plate of the converter to keep it applied by oil from the turbine side of the converter at lower operating pressures so as to prevent overheating and damage to the to the converter by converter lockup clutch burn out or failure.

Also, in accordance with the invention, in the preferred embodiments, in order to provide sufficient fluid flow to the torque converter to prevent dragging of the clutch lining and sever heat buildup within the converter, the diameter of the converter feed land 43, 143 is reduced to create additional leakage between the valve 40, 140 and the bore 16 of the transmission. The factory diameter of the three lands of the Honda® 4 and 5 speed automatic transmissions is set at 0.511 to 0.5112 inch. In keeping with the present invention, this dimension of the land 43, 143 is reduced such as to between 0.5093, plus or minus 0.0002 inch. In this manner, a full time or continuous feed of transmission fluid flows from the transmission pump to the torque converter. The clearance is equal to a hole of 0.55 to 0.59 inch and permits more cooling flow to reduce the occurrence of converter over heating at low engine RPMs.

I claim:

1. A pressure regulator valve for use in an automatic transmission and wherein the valve is configured to be seated within a bore of a transmission so as to control fluid flow from a transmission pump to a torque converter, pressure regulator balance flow and flow to a pressure regulator dump circuit, the pressure regulator valve comprising a body including spaced first and second core portions from which first, second and third fluid flow controlling annular lands extend, the first land being formed at an inner end of the body for controlling pressure regulator balance fluid flow, the second land being spaced between the first and third lands for controlling fluid flow to a torque converter of a transmission, the second land having a rear continuously inwardly tapering conical surface that extends toward and terminates at an outer wall of the first core portion between the first and second lands, the third land being spaced from the second land for controlling fluid flow to a pressure regulator dump circuit, the third land having a rear inwardly tapering conical surface that terminates at an outer wall of the second core portion extending between the second and third lands, and a boost sleeve and spring supporting extension portion extending forward of the third land whereby the tapering surfaces of the second and third lands allow a variable flow rate to be established relative to the fluid flows being controlled thereby, and a blind hole extending from the inner end of the valve body through the first land and into the first core portion, and a balance assist spring mounted partially within the blind hole for providing force to continuously urge the pressure regulator valve against pressure regulating springs mounted about the extension portion of the valve when the pressure regulating springs are mounted within the boost sleeve surrounding the extension portion.

2. The pressure regulator valve of claim 1 including a hole provided through the first core portion and transverse to a central axis of the body of the pressure regulator valve.

3. The pressure regulator valve of claim 1 wherein the second land is formed so as to provide a clearance between the second land and the bore in which the valve will be mounted so as to allow fluid flow to pass between the second land and walls defining the bore.

4. The pressure regulator valve of claim 1 wherein the rear inwardly tapering conical surfaces of the second and third lands are angled between 20° to 50° relative to a central axis of the body.

5. The pressure regulator valve of claim 1 wherein the rear inwardly tapering conical surfaces of the second and third lands are angled between 35° to 45°.

6. The pressure regulator valve of claim 5 wherein front faces of the first and second lands taper inwardly toward the first and second core portions, respectively.

7. The pressure regulator valve of claim 6 wherein the front faces taper at approximately 45° relative to the central axis of the body.

8. The pressure regulator valve of claim 5 wherein the first land has generally planar front and rear surfaces.

9. The pressure regulator of claim 1 wherein the first land has generally planar front and rear walls.

10. A pressure regulator valve for use in an automatic transmission and wherein the valve is configured to be seated within a bore of a transmission so as to control fluid flow from a transmission pump to a torque converter, pressure regulator balance flow and flow to a pressure regulator dump circuit, the valve comprising a body including spaced first and second core portions from which first, second and third flow controlling annular lands extend, the first land being formed at an inner end of the body for controlling pressure regulator balance flow, the second land being spaced between the first and third land for controlling flow to a torque converter of a transmission, the second land having a rear inwardly tapering conical surface that terminates at an outer wall of the first core portion between the first and second lands, the third land being spaced from the second land for controlling fluid flow to a pressure regulator dump circuit, the third land having a rear inwardly tapering conical surface that terminates at an outer wall of the second core portion, and a boost sleeve and spring supporting extension extending forward of the third land whereby the tapering surfaces of the second and third lands allow a variable flow rate to be established relative to the fluid flows being controlled thereby and a blind hole extending from the inner end of the valve body and into at least a portion of the valve body, and a balance assist spring mounted at least partially within the blind hole for providing force to continuously urge the pressure regulator valve against pressure regulating springs mounted about the extension of the valve when the pressure regulating springs are mounted within the boost sleeve surrounding the extension portion.

11. The pressure regulator valve of claim 10 wherein the second land is formed so as to provide a clearance between the second land and the bore in which the valve will be mounted so as allow fluid flow to pass between the second land and walls defining the bore.

12. The pressure regulator valve of claim 10 wherein the rear inwardly tapering conical surfaces of the second and third lands are angled between 20° to 50° relative to a center axis of the body.

13. The pressure regulator valve of claim 10 wherein the rear inwardly tapering conical surfaces of the second and third lands are angled between 35° to 45°.

* * * * *